United States Patent [19]

Bliss

[11] Patent Number: 4,534,000
[45] Date of Patent: Aug. 6, 1985

[54] INERTIAL FLIGHT DIRECTOR SYSTEM

[76] Inventor: John H. Bliss, 2740 Graysby Ave., San Pedro, Calif. 90732

[21] Appl. No.: 580,441

[22] Filed: Feb. 15, 1984

Related U.S. Application Data

[63] Continuation-in-part of Ser. No. 297,370, Aug. 28, 1981, abandoned, which is a continuation-in-part of Ser. No. 137,307, Apr. 4, 1980, abandoned, which is a continuation of Ser. No. 937,730, Aug. 29, 1978, abandoned, which is a continuation-in-part of Ser. No. 751,801, Dec. 17, 1976, Pat. No. 4,133,503, which is a continuation-in-part of Ser. No. 669,273, Mar. 22, 1976, abandoned, which is a continuation-in-part of Ser. No. 608,408, Aug. 29, 1975, Pat. No. 4,021,010.

[51] Int. Cl.³ .................. G05D 1/12; G06G 7/70; B64C 13/18
[52] U.S. Cl. .................. 364/428; 364/429; 364/430; 244/186
[58] Field of Search .................. 364/428, 429, 430; 244/179, 183–188

[56] References Cited

U.S. PATENT DOCUMENTS

| | | | |
|---|---|---|---|
| 3,618,002 | 11/1971 | Stinson | 340/968 |
| 3,927,306 | 12/1975 | Miller | 364/430 X |
| 3,964,053 | 6/1976 | Heiser | 364/429 X |
| 4,004,758 | 1/1977 | Boriss et al. | 364/429 X |
| 4,021,010 | 5/1977 | Bliss | 364/428 X |
| 4,133,503 | 1/1979 | Bliss | 244/188 |
| 4,141,522 | 2/1979 | Lambregts | 244/186 |
| 4,357,661 | 11/1982 | Lambregts et al. | 364/430 |

OTHER PUBLICATIONS

MacKinnon: Improving Automatic Landing System Performance Using Modern Control Theory and Inertial Measurements, Jan. 1969, MIT Instrumentation Laboratory Report.
Gelb et al.: Applied Optimal Estimation, the MIT Press, 1974, Cambridge MA.

Primary Examiner—Felix D. Gruber
Attorney, Agent, or Firm—William W. Haefliger

[57] ABSTRACT

The disclosed apparatus is useful in controlling an aircraft inertial flight path on the final approach to landing to coincide with a desired flight path represented by the intersection of the localizer and glide path electronic beam signals, and there being an inertially responsive unit on the aircraft.

The apparatus includes:
(a) Dual antenna systems carried on the aircraft spaced apart laterally to receive said beams, and
(b) circuitry responsive to the beam signals received by the two antenna systems to coact with the inertially responsive unit to produce an output for controlling the inertial path of the aircraft to coincide with the desired path defined by said localizer and glide path signals.

15 Claims, 19 Drawing Figures

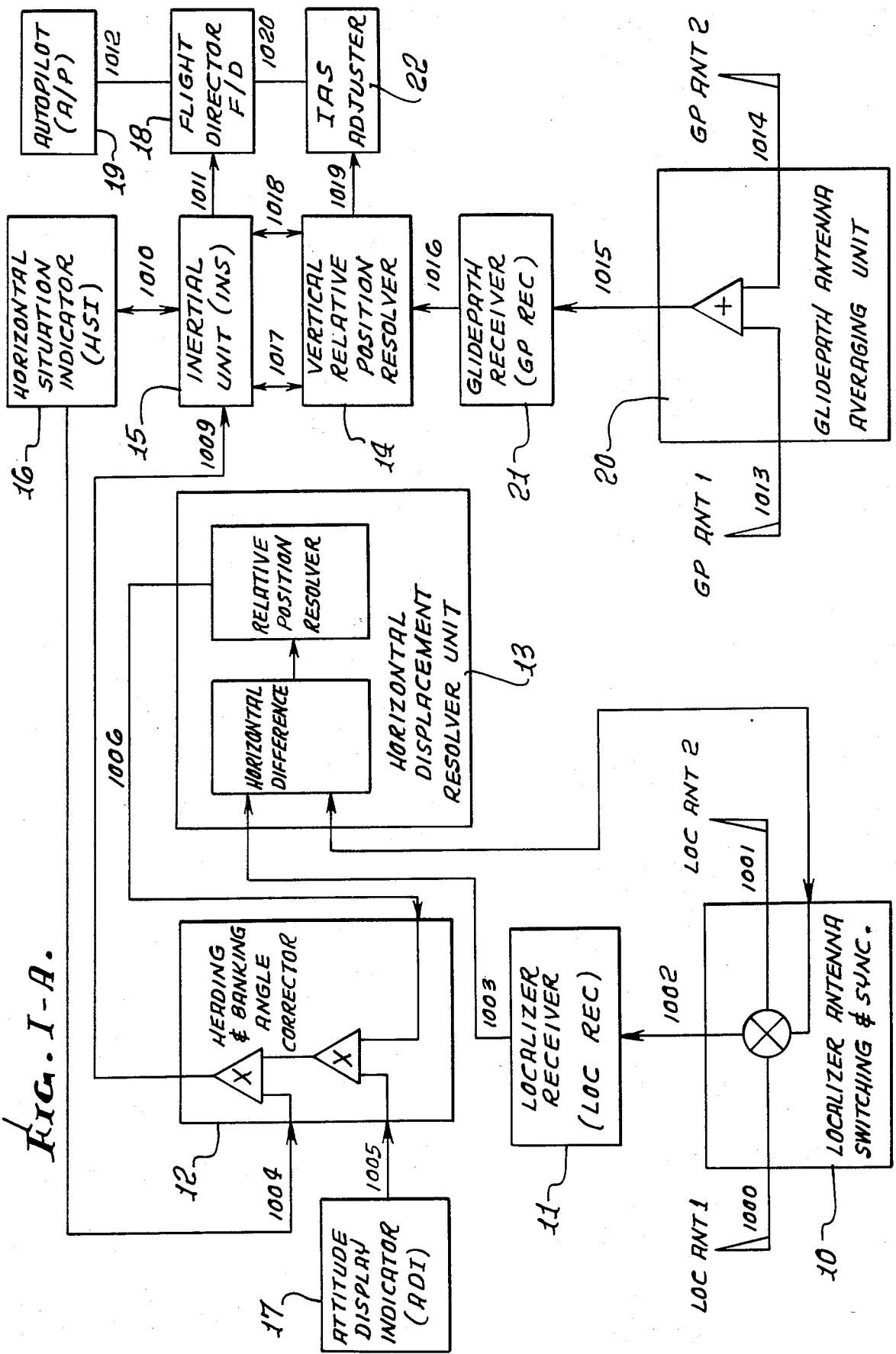
FIG. I-A.

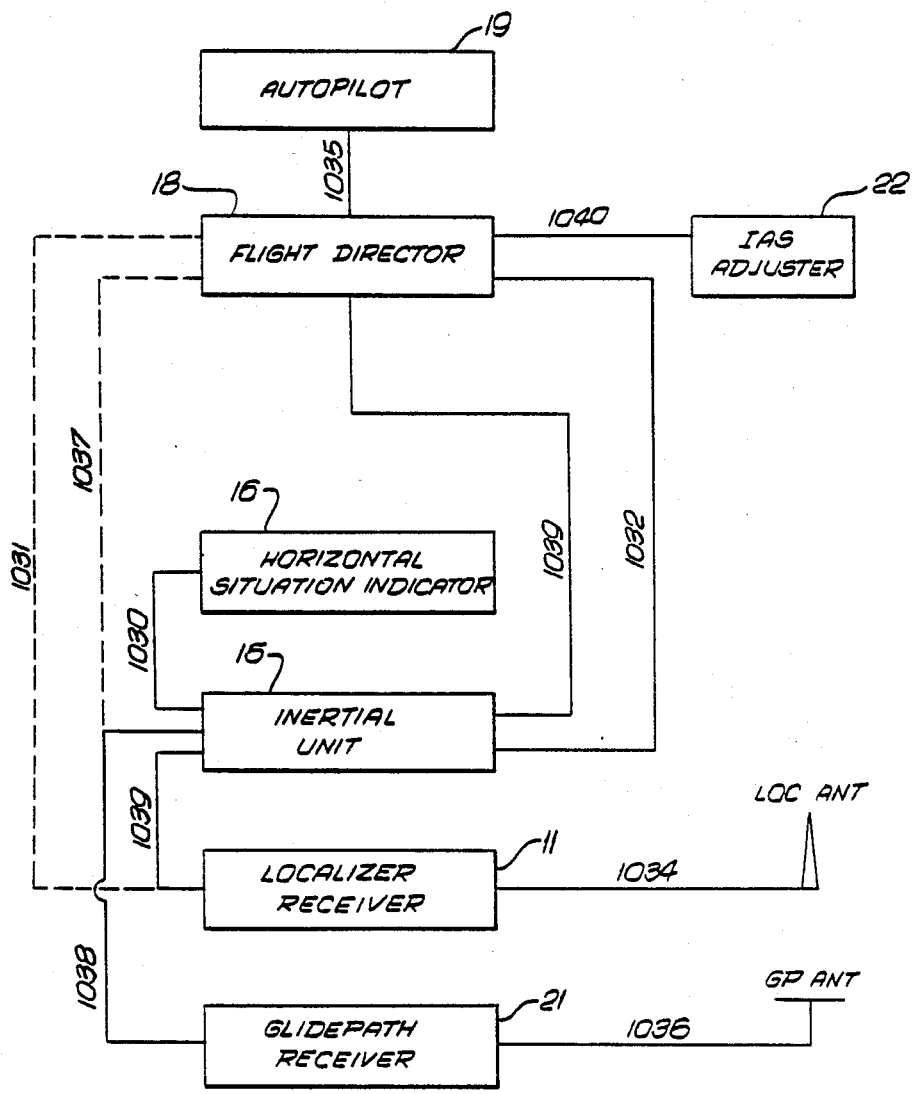
Fig. IV.
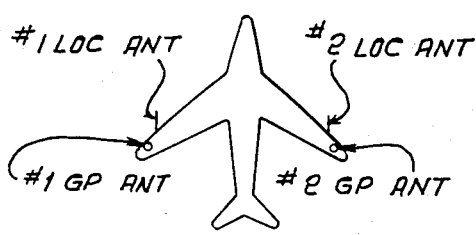
Fig. IA.
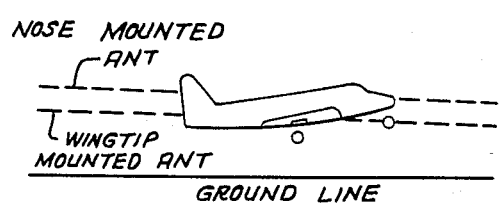
Fig. IB.

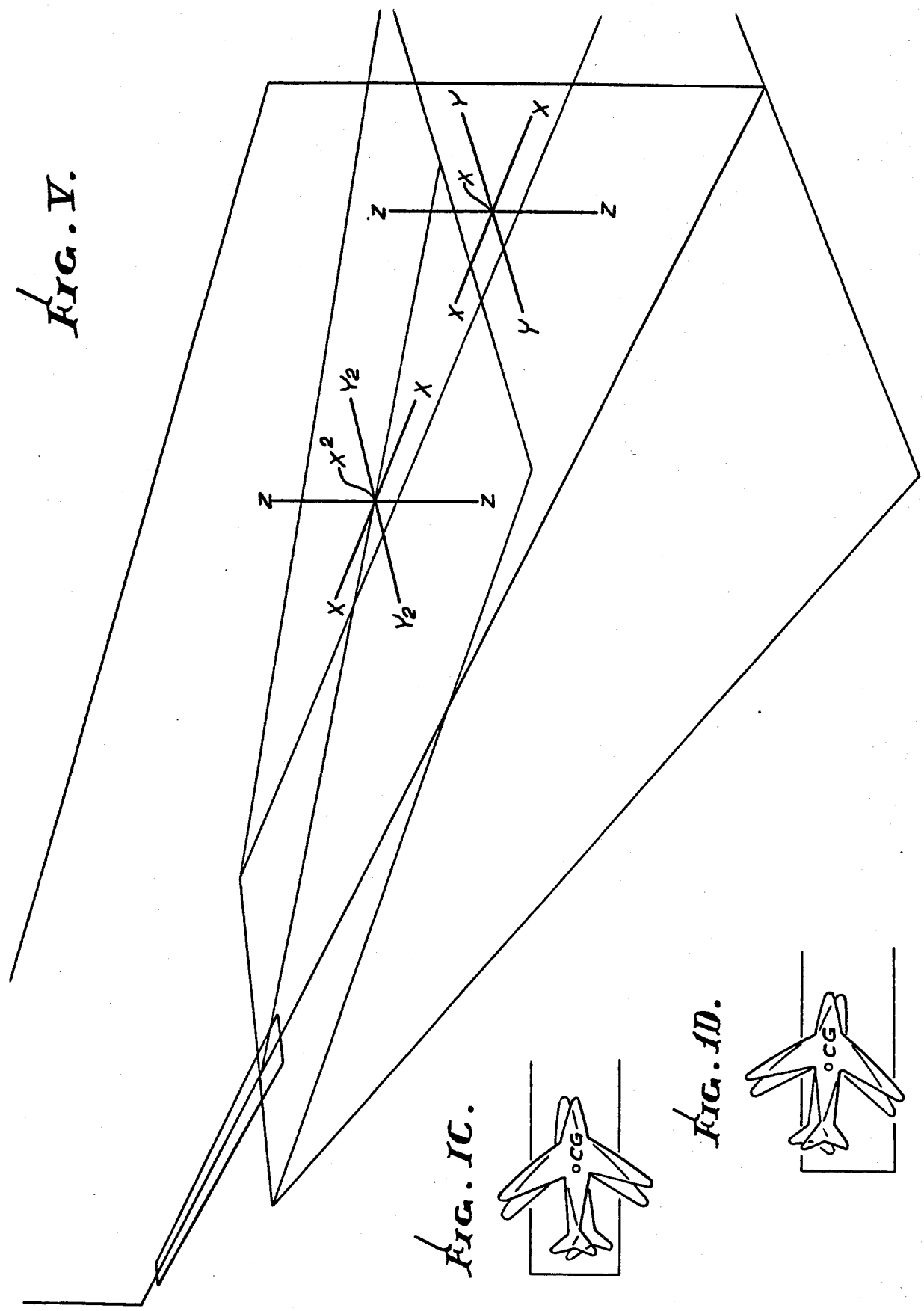
Fig. V.
Fig. IC.
Fig. ID.

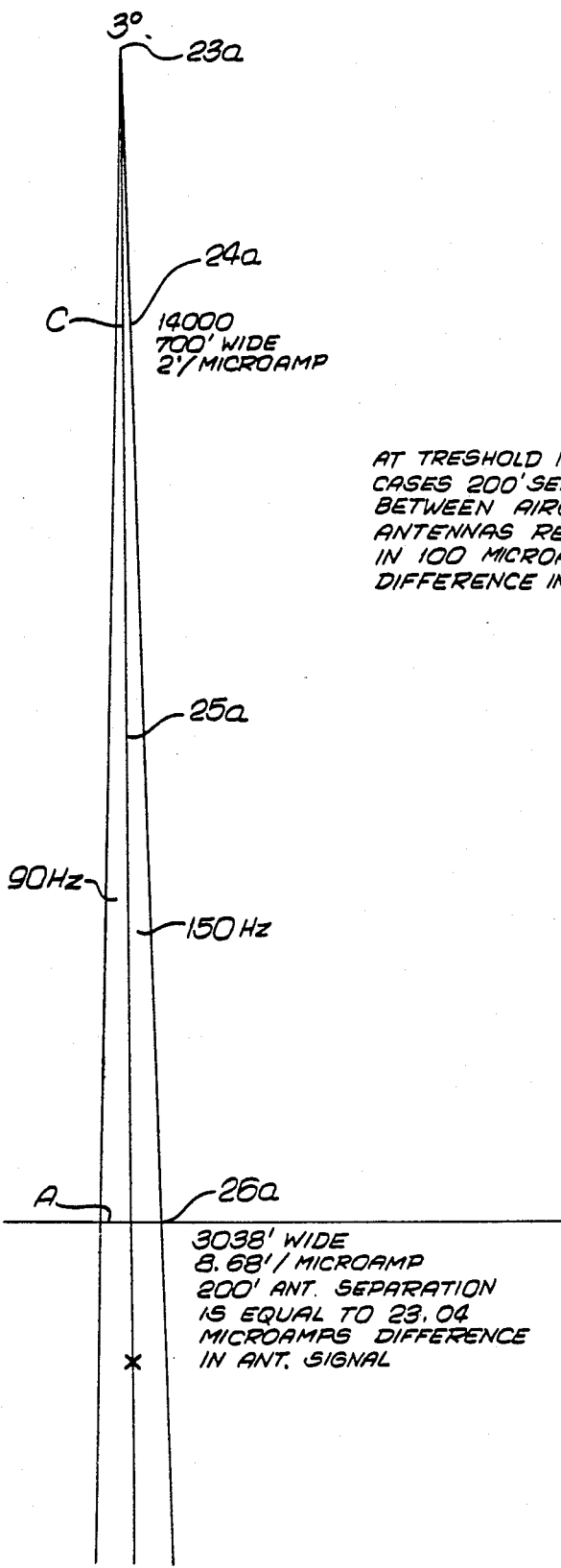
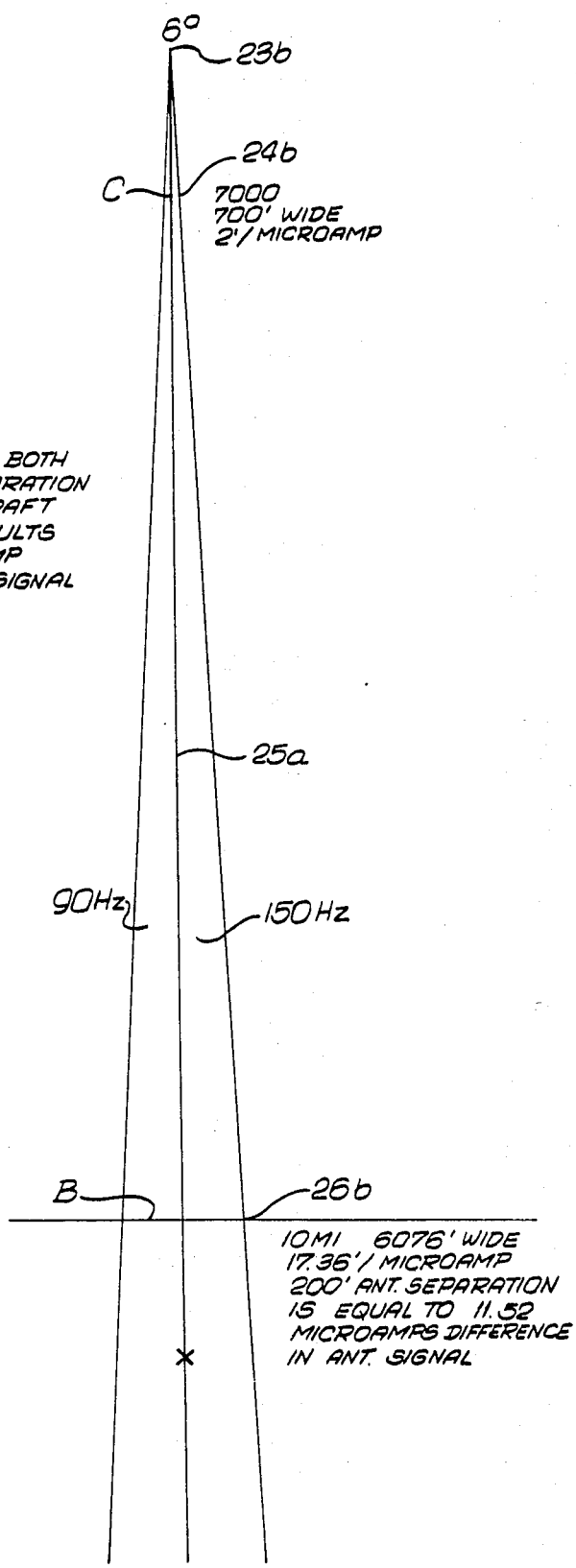

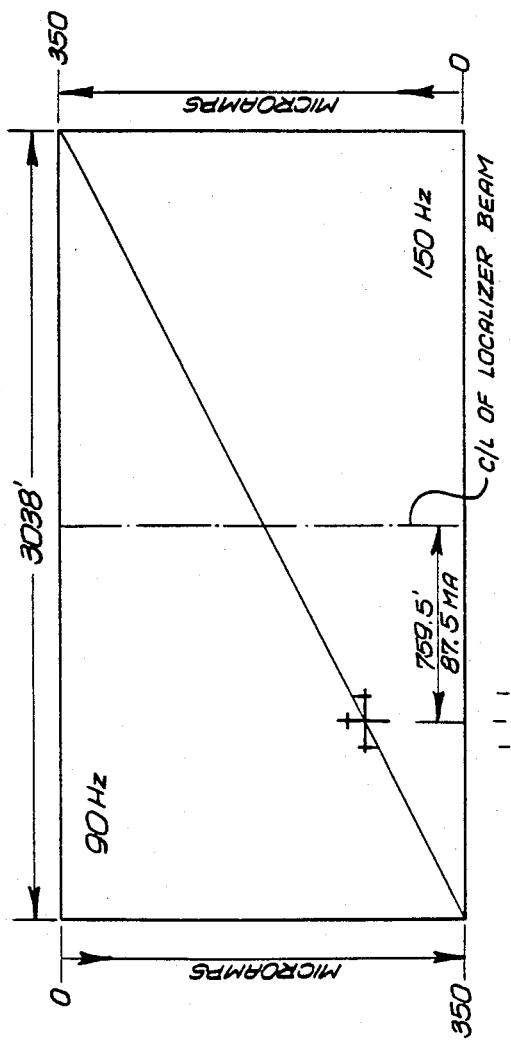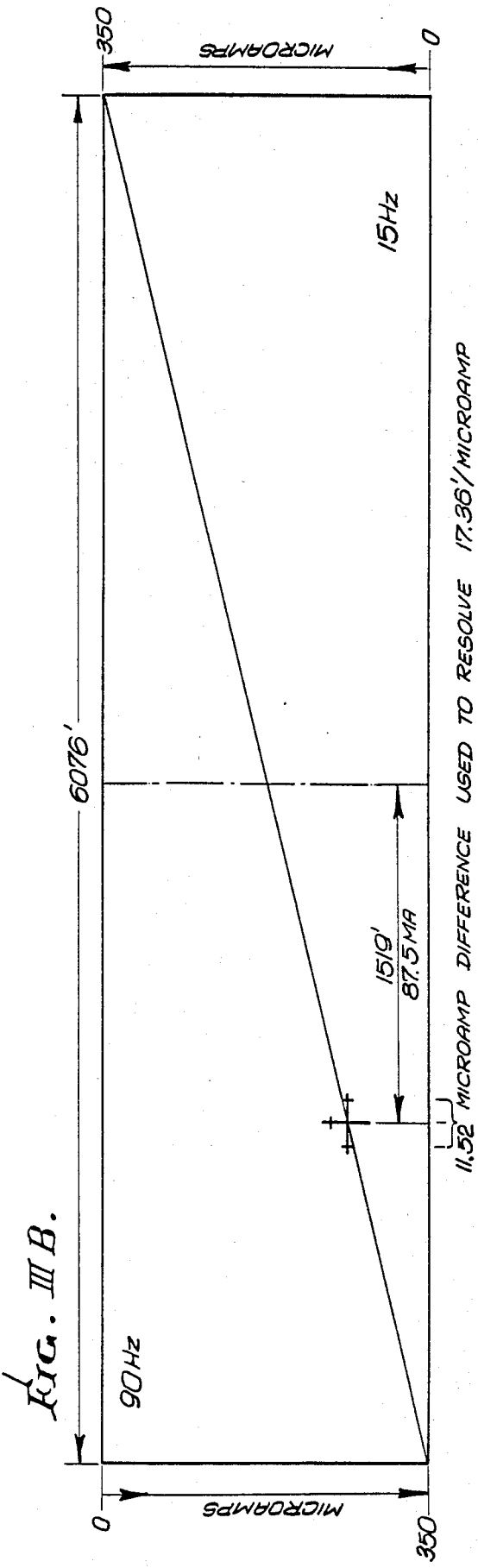

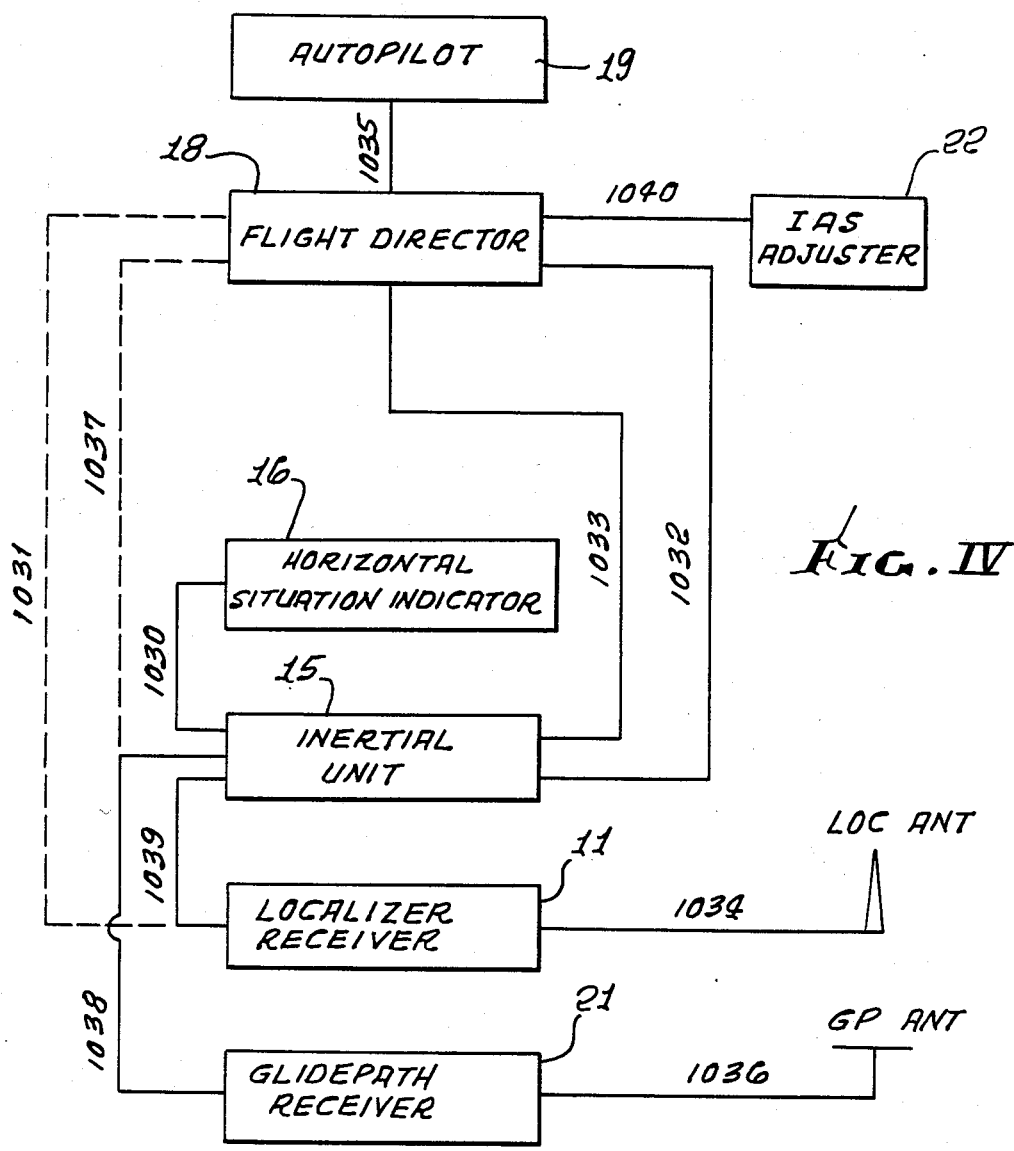
Fig. IV-A.
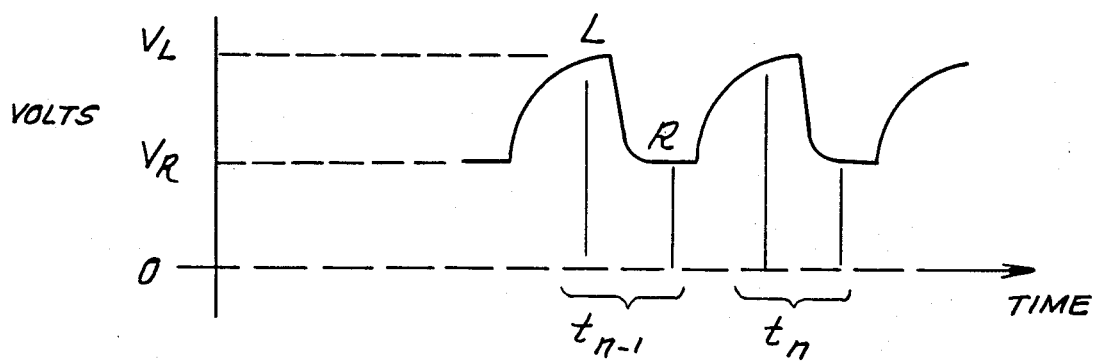
Fig. VI.

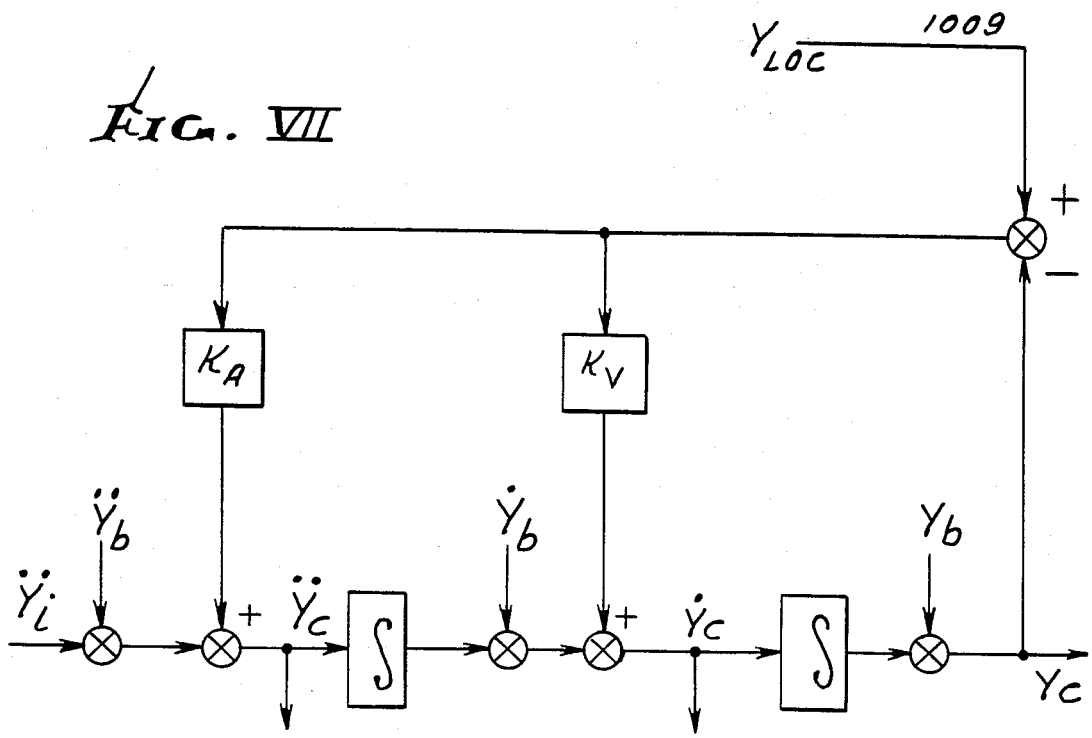
Fig. VII
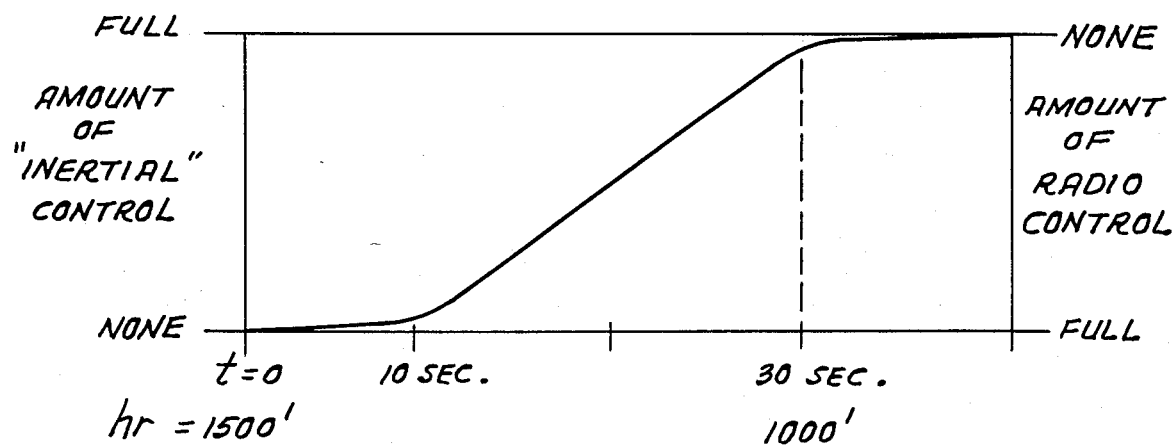
Fig. IX.

Fig. VIII.
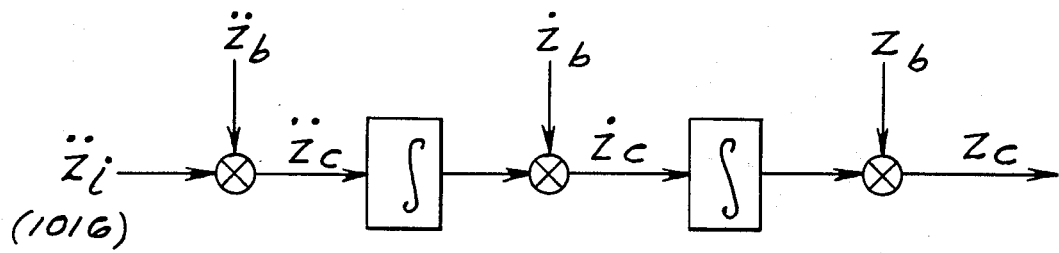
Fig. VIII-A
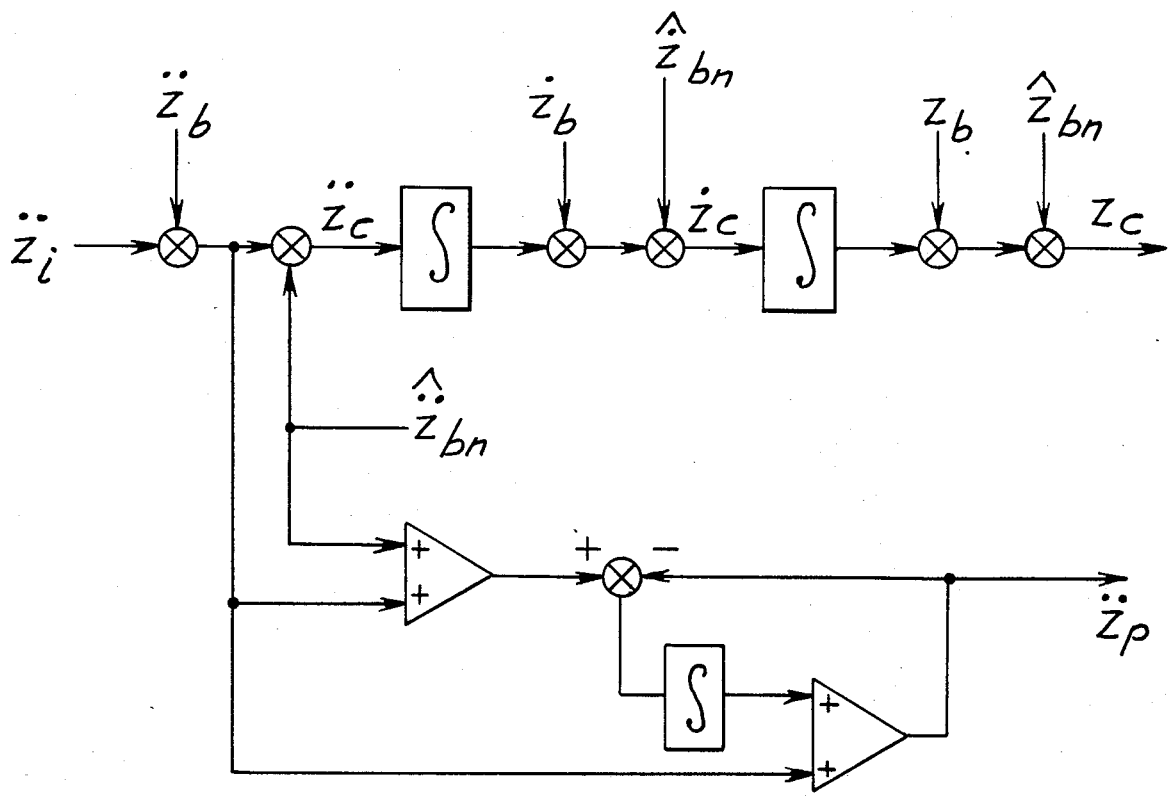

INERTIAL FLIGHT DIRECTOR SYSTEM

BACKGROUND OF THE INVENTION

This application is a continuation-in-part of my prior application Ser. No. 297,370 which was filed Aug. 28, 1981 (now abandoned), which was a continuation-in-part of my prior application Ser. No. 137,307, filed Apr. 4, 1980 (now abandoned), which was a continuation application of my prior application Ser. No. 937,730 filed Aug. 29, 1978 (now abandoned), which was a continuation-in-part application of my prior application Ser. No. 751,801 filed Dec. 17, 1976 (now U.S. Pat. No. 4,133,503), which was a continuation-in-part of my prior application Ser. No. 669,273, filed Mar. 22, 1976 (now abandoned), which was a continuation-in-part of Ser. No. 608,408, filed Aug. 29, 1975, now U.S. Pat. No. 4,021,010.

This invention relates generally to control of aircraft on landing approaches, and more particularly concerns improvements in approach flight director systems.

Present flight director systems are being used more and more in an approach monitoring capacity when used in continuing lower landing minima. The trend is to depend upon more sophisticated auto-land systems to perform the controlling function while the pilot is relegated to perform a monitoring function. A pilot is justifiably uncomfortable when the information presented is insufficient to allow him to perform the same task manually which an automatic system is doing for him.

When the capability of the flight director is limited to the extent that proper monitoring is not possible, it becomes unacceptable. This situation can be compounded when additional hazard is considered such as a wind shear encounter. Such crude information can then lead to confusion.

The prior patents, of which this application is a continuation-in-part, address the problem of speed control during all approaches including the wind shear environment. The present invention addresses the problem of accurate guidance during all approaches, including the wind shear environment.

It is intended that with the increased accuracy provided by the speed control equipment, in conjunction with the improved guidance provided by the described flight director, whether provided head-up or head-down, correct guidance will be provided whether wind shear is encountered or not. The accuracy desired is that necessary to provide the capability for proper monitoring of auto-systems, and to increase the pilot's informational and guidance capability for manual approaches of essentially the same quality.

SUMMARY OF THE INVENTION

The key factor of the present system to overcome these above referenced deficiencies rests on the management of the attitude commands as represented by the command bars on the flight director, displayed head-up or head-down, and fed to the autopilot during a coupled approach. By predicating the banking attitude command totally with reference to the inertial path of the aircraft relative to the desired inertial path regardless of heading, and the angle of attack command necessary to maintain a proper inertial glidepath, with indicated airspeed corrections to control angle of attack, correct programming is produced for proper attitude commands in the event of an encounter with lateral or vertical windshear.

One prerequisite for the calculations to be described is to have an accurate groundspeed value at all times on the approach. Means for obtaining this groundspeed value are adequately described in my prior patents and applications referred to above and regarding speed control devices for use on the final approach. As will appear, many parameters available from an inertial navigation system (INS) may be used within this system, including groundspeed. It is a major objective of this invention to integrate the inertial path of the airplane with existing means of radio or electronic approach means so as to establish improved approach instrumentation and control during the final approach to achieve more accurate and safer approaches especially in poor weather conditions when large values of windshear may be present.

The heart of this system is the inertial platform from which acceleration components across course and vertically are detected. Accelerations along course may also be used. The platform is maintained horizontal by gyroscopic means in the conventional manner as one familiar in the art can recognize. This platform can interface with other instruments such as the Horizontal Situation Indicator (HSI) and the Attitude Display Indicator (ADI) in the conventional manner, and have multiple utility. The following description will be confined to the use of the inertial platform to produce an improved approach instrumentation, displayed head-up or head-down, and to provide inputs to an outpilot for use during the final approach phase of flight. It is also contemplated that this system be used along with previously disclosed speed control devices which may involve relatively large excursions of indicated airspeed (IAS) during a final approach when large windshear values exist.

Since the direction of the inertial path of an airplane is changed in azimuth primarily by banking angles, the command bar controlling bank commands in this system is controlled laterally by the aircraft's inertial track relative to the localizer on-course which coincides with the desired inertial track. A specific heading is irrelevant during the approach except in the final phase when the aircraft is in the landing flare. The body angle command is controlled by the inertial path of the aircraft relative to the desired inertial glidepath, with an angle of attack command correction required to maintain the correct inertial glidepath position during varying airspeed conditions.

These and other objects and advantages of the invention, as well as the details of an illustrative embodiment, will be more fully understood from the following description and drawings, in which:

DRAWING DESCRIPTION

FIG. I is a block diagram of the system; and FIGS. IA, IB, IC and ID are associated views of aircraft representations;

FIG. I-A is a modified form of FIG. I;

FIG. II is a display of the two extremes of ILS angle widths, indicated in FIGS. IIA and IIB;

FIG. III and associated views IIIA, IIIB and IIIC show details of signals at selected localizer positions in FIG. II.

FIG. IV is a block diagram of a simplified version of the system;

FIG. IV-A is a modified form of FIG. IV;

FIG. V is a diagram of the orientation of the inertial planes.
FIG. VI is a wave form;
FIG. VII is a circuit diagram;
FIG. VIII is a circuit diagram;
FIG. VIII-A is a circuit diagram; and
FIG. IX is a control vs distance diagram.

DETAILED DESCRIPTION

Figure 1:
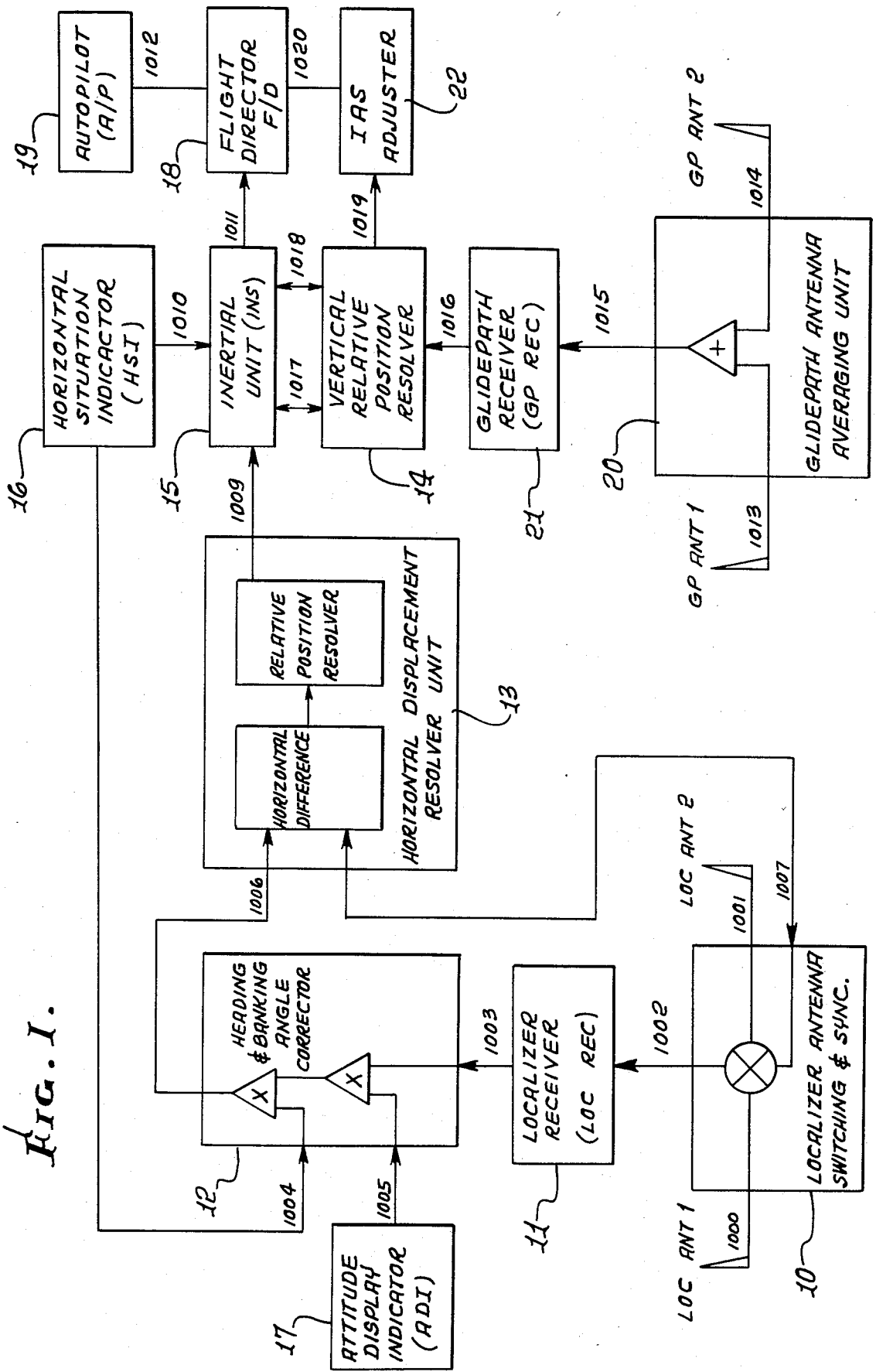

The many features and advantages of the system will become evident in the following detailed description. It is assumed to have general utility in a wide range of aircraft types, and, used in combination with the speed control devices previously patented by the inventor, it forms a complete method of inertial vector control of the aircraft on the approach to effect a more precise, accurate approach system less susceptible to errors in command during the final approach phase of flight. It has some further particular advantages when used in large wide-body jet aircraft and helicopters. The following components may be comprised of units commerically used and available, with possible modification as herein later described: Autopilot (A/P), Flight Director (F/D), Attitude Display Indicator (ADI), Horizontal Situation Indicator (HSI), Inertial Navigation System (INS), Localizer Receiver (LOC REC), and Glidepath Receiver (GP REC). In this description the Localizer Receiver is treated as a type normally in use today, however, it is assumed that a Microwave Landing System (MLS) receiver may be equally applicable. A more simple inertial system specifically designed for this approach system may be used in place of the INS system as herein later described.

In the following, beam width is meant to describe those positional points where a raw data signal display will produce a full ILS needle deflection in the aircraft instrumentation at the beam width extremeties.

Referring to FIG. II; the drawings display ILS or MLS beams of the two extremes of angles, 3° or 6° in width as in FIGS. IIA and IIB respectively. Most systems utilize a beam width of approximately 5°. Each individual installation is normally adjusted so as to provide a beam width of near 700 feet at the approach end of the runway. The distance from the transmitting antenna 23a and 23b to the approach end of the runway 24a and 24b varies from one installation to the next, which results in varying widths from one installation to the next. It is important within this system that the center line 25a and 25b of the localizer beam be accurately sensed relative to the aircraft position for programming the inertial system. An aircraft receiver with only one localizer antenna will receive the same off-course signal at points 26a and 26b as at points 24a and 24b. This is true of conventional installations commonly in use today.

Though the actual distance of the aircraft from the center line 25a and 25b of the localizer may be quite different, an aircraft may receive the same off-course signal with a single antenna depending on beam width and distance from the transmitting antenna. It is contemplated within the present invention that with two antennas mounted on the aircraft a known distance apart, (200 feet separation is used in the example), the difference in received signals may be used to resolve the actual distance of the aircraft from the center line 25a and 25b of the ILS localizer beam. This requires a correction to the signal difference received by the two antennas due to aircraft heading different from the inbound course, and a further correction due to bank angle herein later described.

Referring to the block diagram in FIG. I, there is an airborne dual antenna localizer receiver (11) coupled with a dual antenna glidepath receiver (20) which will be treated separately, though usually they will be in use at the same time.

The localizer beam is received by use of localizer antennas #1 and #2 through paths 1000 and 1001 to the localizer antenna switching and synchronizing circuit (10). The unit (10) separates, periodically and synchronously utilizing a signal (1007) from the horizontal displacement resolver unit (13). The signal (1007) selects between antennas #1 and #2; thus, the data into unit (13) has been correlated to be coming from antenna #1 or #2. The output of the switching circuit (10) in combination with the localizer receiver (11) through path 1002 resolves the total microamp of the signals at antenna #1 or #2 as required by signal 1007. The signal is corrected in unit (12) via path 1003 for heading difference due to placement of the two antenna 200 feet apart and bank angle difference from the level. Signal 1004 from the horizontal situation indicator (16) is used to scale the difference in heading and signal path 1005 from the attitude display indicator (17) (or the equivalent from the INS (15) not shown) levels out the signals from the displaced antenna. After these corrections are made, the signal (1006) received by the horizontal displacement unit (13) from antenna #1 and #2 is as would be obtained if the aircraft was continuously maintained on the inbound heading with the wings level.

The operation of unit (13) will be more fully described in a later portion of this disclosure; however, the localizer signals as received by the localizer antennas #1 and #2 are received, separated, and synchronously processed in units 10, 11, 12 and 13 in such a manner so that the microamp signal from antenna #1 is compared to that from antenna #2 to resolve the horizontal displacement of the aircraft from the centerline of the localizer beam if such displacement exists, or the maintenance of a centerline position. Line 1007 connects units 10 and 13, for this purpose. At any time the aircraft is within the width limits of the localizer beam, the combined system as represented by 10, 11, 12 and 13 resolve the actual position of the aircraft relative to the centerline of the localizer beam (25a and 25b, FIG. II) instead of the angular position as in conventional, single antenna systems. This information is used first to assure a flight path to intercept the localizer centerline; and subsequently, to assure that the inertial "desired track" coincides with the localizer centerline. The manner in which this is done will become clear in the description of the drawings in FIGS. II and III. The inertial unit (15) receives this signal (from unit (13)) via path 1008. The aircraft may be guided initially in a "heading" mode; then in an "ILS armed" mode; then in a "radio ILS capture" mode, as in conventional systems, until the intercept of the ILS centerline position. Upon first intercept of the ILS centerline position, the inertial unit (15) receives a signal via path 1009 to automatically insert the "present position" as a "waypoint position" and at that time a "desired track" from that "waypoint position" is programmed into the inertial computer (15) from the HSI inbound track setting via path 1010 equal to the relative bearing of the inbound track as set by the pilot. Until the moment of initial intercept of the ILS centerline, the flight director (F/D) system (18) may operate in a purely conventional manner. After the initial ILS centerline intercept, the inertial unit (15) assumes the primary command function for the Flight Director (F/D) and/or Autopilot (A/P) combination about the roll axis. This inertially derived initial centerline intercept point, hereinafter referred to as point "X", (SEE FIGS. IIa and IIb) forms the "from" waypoint during the approach. A "to" waypoint may at this time be inserted into the INS computer in a number of ways. It may be a point at any distance along an extended line formed by the relative bearing of the inbound course selected by the Pilot and set on the HSI, with subsequent fine corrections made by signals from the horizontal displacement resolving circuit (13); or, as may be more practical, to trim the zero deviation, or wings level position, of the F/D computer at a controlled rate by signals from (13) so that the inertial position is compensated to coincide with the radio ILS centerline position at all times during the approach. That is, the signal from unit (13) causes the INS (15) to bring the INS centerline, and thus the aircraft's centerline, in line with the received ILS centerline.

It is assumed that the inertial programming is adjusted so as to be far more sensitive to track deviations all during the approach than can be obtained within radio systems, and specific heading information is irrelevant to the operation of the system. It is therefore important and appropriate to describe the operation of the flight director (F/D), unit (18), and the programming thereof.

Though it is understood that most INS systems utilize information primarily in a digital format, it is assumed by the inventor that digital or analog information may be used to accomplish the following without departing from the inventive philosophy disclosed herein, appropriate DAC and ADC devices also being usable.

As previously stated, all functions and operation of the F/D are conventional up to the time the aircraft reaches the point "X", the initial centerline intercept point, with the possible exception of a small modification of programming to assure positive centerline intercept early on the approach. After passing point "X", any subsequent alignment input into the INS computer adjusting the position of the "desired inertial track" are made using point "X" as a fulcrum, even though an intermediate additional computer may be used to achieve that result computationally.

The modern flight director computer, with its advanced state-of-the-art capabilities is used, retaining all of its capability, but is programmed quite differently after point "X" is passed. The command input to the F/D computer (18) comes from the inertial unit (15) via path 1011, which is corrected, or biased by a signal from the horizontal displacement resolver (13) via route 1009 aligning the inertial "desired track" with the centerline of the ILS or MLS localizer. The inertial system, with its high accuracy and sensitivity then controls the F/D computer. The F/D computer, which normally resolves a heading, now resolves a bank angle in precisely the same manner, with all the advantages of intercept characteristics displayed in the heading method of control but with some important advantages. If the inertial travel of the aircraft coincides with the centerline of the ILS or MLS localizer, there will not be any bank angle commanded. Unless the inertial line of travel is changed, changes in lateral wind component which result in heading changes of the aircraft leave the system unaffected, thereby eliminating a very large amount of supefluous and erroneous commands. It is important to mention the fact thart foreign systems which may have authority great enough to cause a heading to be maintained beyond the normal aerodynamic stability of the aircraft, such as some yaw dampeners, may have a deleterious effect upon the operation of this system. The autopilot (19) should be tuned to a coordinated flight condition, with as little side load, or yaw, as possible, for accuracy during coupled approaches. It should be noted that, when using this type system, the heading of the airplane is of no importance until the landing flare stage, where the normal existing de-crabbing system can be effective.

Whenever an aircraft assumes a banked attitude, its inertial direction is changed. Since, within this system, all inputs and programming are concerned only with the inertial path, the inertial path relationship relative to bank angle is important. This relationship is developed in the following table:

| Across course correction (FPS) | Across course G Force (Tang.) | Bank Angle (Degrees) |
|---|---|---|
| 1 | .0310945 | 1.7816 |
| 2 | .0621890 | 3.5616 |
| 3 | .0932835 | 5.3466 |
| 4 | .1243781 | 7.1166 |
| 5 | .1554726 | 8.8366 |
| 6 | .1865671 | 10.5666 |
| 7 | .2176616 | 12.2799 |
| 8 | .2487562 | 13.9633 |
| 9 | .2798507 | 15.6349 |
| 10 | .3109452 | 17.2716 |
| 11 | .3420398 | 18.8833 |
| 12 | .3731343 | 20.4633 |
| 13 | .4042288 | 22.0149 |
| 14 | .4353233 | 23.5233 |
| 15 | .4664179 | 25.0049 |
| 16 | .4975124 | 26.4616 |
| 17 | .5286069 | 27.8633 |
| 18 | .5597014 | 29.2366 |
| 19 | .5907960 | 30.5749 |

It is assumed that the autopilot may be commanded from the control signal used to operate the flight director display to provide means for a coupled approach. This signal is represented as through path 1012 from the F/D (18) to the A/P (19).

Referring now with greater detail to the "horizontal displacement resolver unit" (13); FIG. II contains drawings IIA and IIB, representing the two extremes of beam widths in use for ILS localizer systems. Drawing IIA represents a localizer beam width of 3° and IIB one of 6° width. In both cases the runway threshold position at 24a and 24b represents a beam width of 700 feet and 350 microamp difference measured from edge-to-edge at the runway threshold. In any case, when an aircraft is located on the centerline of the localizer the port wing antenna will receive a signal modulated at 90 Hz of the same strength as the starboard wing antenna receives modulated at 150 Hz. Also, the port antenna will receive a 150 Hz signal of a strength somewhat less than the one of 90 Hz. The strength difference is greater the closer to the transmitter. The same is true for the starboard antenna but opposite. This is shown in FIG. III by the increasing steepness of the signal line with narrowing beam width.

This description assumes, for clarity, a linear variation in signal across the beam width. A variation other than linear may as well apply and be used. Also, a 200 foot separation between the receiving antennas is used in all examples, but it is assumed a separation of any distance may be used without changing the inventive philosophy. Since the determinant factor of beam width is dependent upon the distance from the localizer transmitting antenna to the threshold of the runway, and the airplane can be at any distance from the transmitter, there are many variables to consider when attempting to detect actual displacement from the centerline. Using two antennas 200 feet apart as illustrated in FIGS. IA and IB, the actual off-course distance may be detected as follows with varying beam widths.

TABLE I

| BEAM WIDTH | SIGNAL DIFFERENCE BETWEEN ANTENNAS | FEET/MICROAMP | OFF-CRS SIGNAL | OFF/CRS DISTANCE |
| --- | --- | --- | --- | --- |
| 700' | 100 Microamps | 2'/Microamp | 87.5 Microamp | 175 ft. |
| 1400' | 50 Microamps | 4'/Microamp | 87.5 Microamp | 350 ft. |
| 2800' | 25 Microamps | 8'/Microamp | 87.5 Microamp | 700 ft. |
| 5600' | 12.5 Microamps | 16'/Microamp | 87.5 Microamp | 1400 ft. |
| 11200' | 5.25 Microamps | 32'/Microamp | 87.5 Microamp | 2800 ft. |

With the advent of large wide-bodied jet aircraft has come some operational problems associated with antenna location for approach equipment. Particularly, this problem is additionally aggravated by the relatively high angle of attack normally used with some of these types of airplanes on the final approach. Most large, low-winged aircraft of this category will benefit from glidepath antennas positioned at the wingtips relative to threshold crossing height. This is diagrammatically shown in FIG. IB. If the nose-mounted glidepath antenna is located on the glidepath there may be insufficient landing gear threshold clearance.

When an airplane changes attitude in flight it may be assumed to pivot about its center of gravity, and thus a wingtip mounted localizer antenna location will assure that the airplane remains closer to the centerline position of the runway during the de-crabbing phase of landing. This is shown in FIG. IC with wing mounted localizer antennas compared to FIG. ID with a nose mounted localizer antenna.

FIG. 11 shows some selected positions, A, B, and C on two different localizer beams in an off-course position and a position "X" on each beam on-course position at any distance greater than A or B from the transmitter. The positions A and B represent positions halfway between the on-course and left beam edge approximately 10 miles from the transmitter. The positions C represent a like position halfway between the left beam edge and centerline position at the runway threshold. The beam extremities at this point, the runway threshold, are near 700 feet wide and are defined by a signal approximately 350 Microamps wide. Though it is extremely unlikely that an aircraft would ever deviate from the on-course position to these extremes after the inertial capture at point "X", they are used as an example only.

Regarding the portrayals in FIG. III; A, B, and C are views which detail the signal patterns of the positions A, B, and C of FIG. II and how they are used in the "Horizontal Displacement Resolver" (13) of FIG. I. As for instance, the signal pattern of position A in FIG. 11 is detailed in FIG. III at A. The scale at the left is a measure of the 90 Hz signal; and at center, the on-course; the 90 Hz signal equals the 150 Hz signal to the right at 175 microamps each. An aircraft at position A in FIG. II will receive signals as shown on FIG. III A to be halfway between the left edge of the beam and the centerline. The beam at this point is 3038 feet wide, and the Port antenna will receive a 90 Hz modulated signal 23.04 microamps greater than the starboard antenna, and a 150 Hz signal 23.04 microamps greater through the starboard antenna than the port. This programs the Horizontal Displacement Resolver Unit (13) in FIG. 1 to resolve 8.68 feet per microamp, as per above TABLE I, and the average signal received by the two antennas is 87.5 microamps left of the on-course, yielding 8.68 × 875 = 759.5 feet left of the centerline, the position of the aircraft. This, then, programs the inertial reference to 759.5 feet to the right of the aircraft position and accuracy of the positioning becomes greater when the aircraft nears the centerline. The off-course inertial positioning system should have commanded a bank toward the centerline from the time of first deviation left of the inertial track. In fact, the inertial system should be sensitive enough to maintain a track of a very few feet accuracy down the centerline, and can be far more accurate than radio positioning during the entire approach from the point of first on-course intercept, point "X".

DESCRIPTION OF THE GLIDEPATH SYSTEM

The glidepath system is treated in a different manner than the previously described localizer system in that it is not possible to conveniently locate two glidepath antennas far enough apart vertically on even the largest aircraft to take advantage of their separately received signals. Therefore, the two glidepath antennas receive signals which are averaged as if received by a single antenna at the average elevation of the two at any given moment. These signals are received (FIG. 1) through glidepath antenna #1 through routing 1013 and glidepath antenna #2 through routing 1014 by the glidepath antenna averaging unit (20). The averaged signal is then routed via 1015 to the glidepath receiver (21). The glidepath receiver than sends a signal via path 1016 to the vertical displacement resolver unit (14) equal to the raw data glidepath signal. Unit (14) may use a portion of the memory within the INS computer and memory circuit via path 1017, or alternatively, receive data from the INS Z axis accelerometer to perform computer and memory calculations separately through path 1018. These inertial signals are aligned in unit (14) so as to conicide with the glidepath signals as received via 1016 to provide vertical guidance signals via path 1019 modified by the IAS adjuster (22) to form an input 1020 to program the body angle, or height command of the nose, to the F/D (18).

Reference is now made to the Vertical Displacement Resolver Unit (14) for a more detailed description of its operation. Since INS systems manufactured primarily for the purpose of navigation in aircraft do not contain the same advanced state-of-the art computer-memory systems regarding detection of vertical acceleration components, or components along the Z axis, as they do for x and y components, unit (14); must resolve and be capable or retaining these values. It must be capable of the same inertial navigational capabilities above and below a horizontal sloping plane as the INS is capable of in solving inertial course problems left or right of a vertical plane described by the desired inertial track during the navigational function. It can do this utilizing the Z axis accelerometer as described in the following description of a more simple inertial approach system. The operation of the Vertical Displacement Resolver and its relation with IAS adjuster (22) is as described in the simple approach system following, and they are identical.

A SIMPLE INERTIAL APPROACH SYSTEM

Many aircraft do not fly routes which justify installation of an INS. The inertial system described in the following need not utilize gyros and accelerometers of the same degree of accuracy as required in INS systems. They must be capable of operation within a reasonable accuracy over a time base of only 10 to 15 minutes instead of many hours such as in INS systems.

Due to the alignment of the gyros and accelerometers within this system, there are some differences from an INS stable platform; however, the platform can be stabilized in a conventional manner as in INS systems.

Referring to FIG. IV, the following are assumed to be as commercially available units: The Autopilot (A/P), unit (19); the Horizontal Situation Indicator (HSI), unit (16); the Localizer Receiver (LOC REC), unit (11); and the Glidepath Receiver (GP REC), unit (21). The Flight Director (F/D) unit (18), is the same as that commercially available, but modified so as to be responsive to commands in angle of bank rather than heading inputs. The Flight Director Computer should retain all track intercept qualities normal to such systems, but is programmed to control bank angle commands instead of heading commands. The Inertial Unit, 15, is a gyro stabilized level platform capable of detecting accelerations in x, y, and z directions, with the capability of adjusting the x and y axes about the z, or vertical axis, so that they may be programmed to discern accelerations as noted in FIG. V. Each of the axes, x, y, and z has its own computer-memory circuit capable of calculation commensurate with INS navigational computers. The axes x, y, and z are mutually perpendicular, and the z axis remains vertical while x is adjusted to remain parallel to the inbound course all during the approach from a signal via path 1030 equal to the relative bearing of the inbound course selected on the HSI. Thus, acceleration along the x axis may be used to update and produce accurate groundspeed signals from other systems such as that derived from Distance Measuring Equipment, Area Navigation Devices, or other systems as detailed in previous patents and applications by the inventor, and referred to above. The accelerations along the y axis are detected and used in the same manner in the y computer as in an INS system to stabilize the inertial positioning of the aircraft on the final approach with a vertical inertial plane containing the Localizer centerline.

The inertial framework depicted in FIG. V shows the platform axes aligned on the approach to measure these acceleration values. Returning to FIG. IV, after the aircraft passes the initial localizer intercept point X, the flight director continues to be programmed by localizer radio information via path 1031 as is normal in present systems, (perhaps modified to assure a subsequent early intercept). Some visual signal should be presented to inform the Pilot that the "Y inertial system is armed," and the inertial system logs all inertial Y inputs into the Y computer processed along with actual groundspeed along the x axis. After an appropriate period of time, as for example, 5 to 10 seconds, a second intercept point position is allowed to enter the Y computer memory. This can be at any point after the time delay period, whenever the aircraft is again in position on the centerline of the localizer. When the second intercept point is logged in the Y computer-memory another visual indication is given the Pilot signifying "Y inertial system captured". From then on the F/D computer is programmed by the inertial system via path 1032 with the present position constantly updated at a controlled rate by the Localizer signal supplied via path 1033. The inertial system retains the initial intercept point x as the pivotal point for these subsequent course, or "desired track" corrections. At this time the point of initial intercept and the point of second intercept form the positional alignment for the vertical inertial plane which the Y accelerometers and Y navigational computer use as the desired inertial track. Any off-course signal detected by the localizer receiver 4a via path 1034 provides an up-date, at a controlled rate, of the position of the vertical inertial plane of reference about an axis centered at point X, and as the off-course signal 1033 (See FIG. IV-A) from the localizer receiver (11) nears the centerline of the localizer, a more accurate inertial positioning is sensed and obtained by giving more priority to the updated position the closer an on-course position is sensed by the localizer receiver.

Since the guidance capability of the inertial system is far more sensitive throughout the final approach than radio systems, and the control of the Y inertial path is through the control of bank angle only, the heading of the aircraft is irrelevant. This is true all during a coupled approach via path 1035 (see FIG. IV-A) until the aircraft reaches the landing flare point, where the normal de-crabbing circuit of the auto-land system controls the heading function.

The guidance and control of the aircraft in relation to the Glidepath (GP) signal is quite similar to the foregoing-description relative to the Localizer. After the initial centerline intercept of the GP position (FIG. V) $X^2$, in the GP command of the F/D continues to be governed by radio signals thru path 1036 received by the ILS Glidepath receiver (21) and used as in present systems via path 1037 until a subsequent intercept of the electronic GP plane. The Z accelerometer and Z computer-memory are armed at $X^2$ and the Z accelerations recorded after the aircraft passes point $X^2$. After an appropriate time interval, a second intercept point is allowed to enter the Z computer-memory when the aircraft is located on the electronic centerline position of the GP. These two glidepath points now determine the location of a horizontal inertial plane sloping from point $X^2$ down to the point of interception of the GP with the runway defined by the ILS glidepath. After the second intercept point is passed, the glidepath commands are relative to this inertial plane. There is visual indication of Z axis inertial arming for the Pilot at $X^2$, and also a visual indication of inertial capture at the second intercept point. At all subsequent times during the approach, the horizontal inertial plane is adjusted at a controlled rate about the horizontal axis of point $X^2$ (defined by axis $Y^2-Y^2$ at that point in FIG. V). These adjustments take place within the Z accelerometer-computer, memory-navigational type system from off-glidepath signals via path 1038 detected by the glidepath receiver (21). Positional priority is given with closer proximity to the on-glidepath signal from the GP receiver (21) via path 1038.

After inertial glidepath capture, the flight director uses inertial glidepath positioning for all programming via path 1039, until the landing flare mode, but is moderated by a signal from the IAS adjuster (22) via path 1040. The unit (22) adjusts the command bars to compensate for the change in attitude required to maintain the correct body angle for the aircraft to remain in a position within the GP inertial plane at varying airspeeds. For example, if the aircraft is stabilized on the approach at an indicated airspeed of 170 knots with the command bars centered, and the indicated airspeed suddenly drops to 140 knots, the change will require a change in body angle to remain within the glidepath inertial plane. The degree of angle of attack change necessary is programmed into unit 22 to bias the command bars to automatically compensate for this required change immediately, so that an undesirable deviation from glideslope is not necessary to produce the necessary change in body angle command.

From the foregoing it will be understood that the invention enables, in conjunction with my previously disclosed devices, a method of total inertial vector control for aircraft on the final approach. Such method being beneficial for aircraft and helicopters alike. Also provided are methods of aligning the inertial control of aircraft to a ground based radio positioning system (ILS or MLS); a method of rotating the inertial plane at a controlled rate of change to align an inertial plane with a ground based radio referenced plane around an initial intercept point; and the use of an indicated airspeed signal to control the F/D commands of body angle to compensate for airspeed changes.

The inertial glidepath may also be programmed for non-precision approaches to form a glidepath of, for instance, 3° from a known position such as a "visual approach point", by use of an altitude change over a distance traveled using an actual groundspeed value. This would require an input from the altimeter and perhaps a manual insertion of the time over the visual approach point.

The inertial glidepath may also be programmed for non-precision approaches to form a glidepath of, for instance, 3° from a known position such as "visual approach point", by use of an altitude change over a distance traveled using an actual groundspeed value. This would require an input from the altimeter and perhaps a manual insertion of the time over the visual approach point.

Unit (10) may be considered to be state-of-the-art multiplexer which can be controlled by a relatively low voltage signal coming from Unit (13). Signal 1007 is typically a voltage square wave in the 1 to 10 Hertz frequency range. Since the signal is generated in Unit (13), it is available in Unit (13) for synchronizing the data sequencing.

The following discusses the functions performed by units (12) and (13) and explains the use of the signals 1003, 1005, 1004, 1006 and 1007. First, the general approach is presented. Then the functions of the specific elements are discussed.

In view of the multiplexing of the left and right wing tip localizer antennas, the LOC receiver will output a square wave as shown in FIG. VI, and because the multiplexing is controlled from the computation section, the parts of the wave will be readily identified with the corresponding antenna sources. The computer will store $L_n$, $L_{n-1}$ and $R_n$, $R_{n-1}$, continuously updating the registers, i.e., a register for two left readings and one for two right. Each computation will utilize the latest input (the last (n+1) of data whether it it is L or R). To illustrate how $Y_{LOC}$ is generated assume the last received data was $V_{RN}$, then $$\tfrac{1}{2}(V_{Rn}+V_{rn-1})=\widetilde{V}_R$$

$$V_{Ln}=\widetilde{V}_L$$

$$Y_{LOC_n} = \left( \frac{\widetilde{V}_L + \widetilde{V}_R}{\widetilde{V}_L - \widetilde{V}_R} \right) K_n, \text{ in feet}$$

$K_n$ is a function of aircraft attitudes. Assuming the distance between antennas is B, then $$K_n = \tfrac{1}{2}B(\cos \phi n)(\cos \psi en)$$

Now if the last received data was $V_{Ln}$, then $$\tfrac{1}{2}(V_{Ln}+V_{Ln-1})=\widetilde{V}_L$$

$$V_{Rn}=\widetilde{V}_R$$

$$Y_{LOC_n} = \left( \frac{\widetilde{V}_L + \widetilde{V}_R}{\widetilde{V}_L - \widetilde{V}_R} \right) K_n, \text{ in feet}$$

Z

Although it is possible to consider either analog, digital or analog/digital processing for the generation of the signal, the previous discussion was given in terms of digital processing. In FIG. I it is indicated that Unit (12) first corrects the signal 1003 data for aircraft attitude.

Signal 1005 is providing bank angle, $\phi$, data that is used in Unit (12) to multiply the LOC signal and then a second multiplication is applied as a function of course datus error, $\psi e$. As shown, Unit (13) is making the sum and idfference and accomplishing the required division. Modified FIG. I-A is provided to indicate the proper sequencing. The signal 1007 is controlling the multiplexing function and at the same time is synchronizing the Unit (13) data input sequencing so that the left and right antenna signals are properly correlated in the unit.

Unit (15) includes digital or analog or digital/analog computation capabilities which are programmable to solve mathematical equations. The lateral basic scheme involves an inertial mathematical model for the lateral motion of the airplane (during approach, after localizer capture and after relatively close track has been established by conventional means). The model then provides an inertial measure of the lateral deviation of the airplane from a vertical plane in space. The plane is adjusted from time to time but asymptotically approaches a best location relative to the "noisy" centerline of the localizer beam. FIG. VII illustrates the method for processing the signal, path 1009.

The signal 1009 is a direct measure of airplane lateral displacement in feet and can be used continuously for comparing with the computed position. This comparison can then provide for continuously adjusting the computer model to provide the best inertial reference plane. Again there are several methods that can be used. The first two are adequately described in the literature. For example, the classical least squares approach is given in below listed reference 1. The classical continuous Kalman approach is given in below listed reference 2.

The third method considered is a simplification of the continuous Kalman filtering technique and is illustrated in FIG. VII. The gains $K_A$ and $K_V$ can be preprogrammed based on design analysis and changed during the approach, e.g., as a function of time after initiation of the "inertial track mode".

Reference (1) "Improving Automatic Landing System Performance Using Modern Control Theory and Inertial Meansurements", D. MacKinnon, January 1969. M.I.T. Instrumentation Laboratory report R-628

Reference (2) "Applied Optimal Estimation" A. Gelb, editor, The M.I.T. Press, Copyright 1974

Units (14) and (15) are used to process the glide path receiver output, signal 1016. The vertical basic method involves an inertial mathematical model for the vertical motion of the airplane (during approach, after glideslope capture and after a relatively close to beam center track has been established by conventional means). The model then provides an inertial measure of the vertical deviation of the airplane from a sloped, horizontal plane. The spatial location of the plane is adjusted from time to time and thereby asymptotically approaches a best location relative to the "noisy centerline of the glideslope beam. The following discussion illustrates methods for processing the signal paths 1016. As indicated in the disclosure, the required computations can be done exclusively in Unit (14) or partly in Unit (14) and partly in Unit (15). For purposes of the following discussion, consider that signal 1018 is passing vertical acceleration, $\ddot{Z}_i$, to Unit (14) from Unit (15). Unit (14) is processing signal 1018 and 1016 data to output data, signal 1019. Attachment 1 provides a discussion of this processing.

ATTACHMENT 1

Programs for Glideslope

Referring to FIG. VIII, $$[Z_i] = \begin{bmatrix} Z_i \\ \dot{Z}_i \\ \ddot{Z}_i \end{bmatrix} = \begin{bmatrix} Z_{i1} \\ Z_{i2} \\ Z_{i3} \end{bmatrix} \quad \begin{array}{l} \dot{Z}_{i1} = Z_{i2} \\ \dot{Z}_{i2} = Z_{i3} \end{array}$$

$$[Z_i] = \begin{bmatrix} V t \frac{t^2}{2} \\ 0 \; 1 \; t \\ 0 \; 0 \; 1 \end{bmatrix} \quad [Z_{i0}] = [T][Z_{i0}]$$

$$[Z_{i0}] = [Z_i] @ t = 0$$

-continued $$Z_c = [T] \begin{bmatrix} Z_b \\ \dot{Z}_b \\ \ddot{Z}_b \end{bmatrix} + \int_o^t \int_o^t \ddot{Z}_i d\tau d\tau$$

Note: $[T_n] = \begin{bmatrix} 1 \; t_n \; \frac{t_n^2}{2} \\ 0 \; 1 \; t_n \\ 0 \; 0 \; 1 \end{bmatrix}$ The basic scheme entails reading $Z_c$ every time glideslope error, GSE, reads 0. It is considered that this value of $Z_c$ is the true error in $Z_c$ except for the contamination due to beam noise. Note that GSE comes in on signal 1016.

Time starts ($t = 0 = t_o$) the first time we choose to recognize a GSE=0, e.g., the first time GSE=0 with radio altitude, $h_r < 1500'$. Up until that time and for a while thereafter the airplane is controlled to a conventional ILS control law.

Time $t_l$, is the elapsed time after $t_o$ that the first $Z_c = Z_{cl}$ is read. $t_n$ is the elapsed time after $t_o$ that the nth $Z_c = Z_{cn}$ is read.

Consider the equation for $Z_c$ which represents the displacement from the ideal glideslope beam center except for the fact that there are bias errors $Z_b$, $\dot{Z}_b$, $\ddot{Z}_b$. If $\ddot{Z}_i = 0$, then $$Z_{cn} = Z_b + \dot{Z}_b t_n + (\tfrac{1}{2})\ddot{Z}_b t_n^2$$

The accumulated values of $Z_{cn}$ and $t_n$ provides a data source to be evaluated in determining the bias errors. Several methods exist for doing this and the one selected is a design choice depending upon the amount of computer resources which the designer wishes to use, his assessment of the bias magnitudes and the extent to which beam noise effects are to be reduced.

Three methods are discussed, the first being the least demanding on computer resources and the other two are classical approaches, i.e., weighted least squares and Kalman estimation methods.

Method 1

Each data point is placed in one of three groups. It is not necessary that the number of data points in each group be approximately equal and also the numbers of data points can be increased beyond the "n" basic points by, for example, doubling up on some points if the noise characteristics justify weighting these points more heavily. To illustrate the procedure, however, consider the groups to be approximately equal as follows.

Group 0
$$\sum_{i=1}^{k_0} Z_{c(3i-2)} = k_0 Z_b + \dot{Z}_b \sum^{k_0} t_{(3i-2)} + \frac{\ddot{Z}_b}{2} \sum^{k_0} t_{(3i-2)}^2$$

Group 1
$$\sum_{i=1}^{k_1} Z_{c(3i-1)} = k_1 Z_b + \dot{Z}_b \sum^{k_1} t_{(3i-1)} + \frac{\ddot{Z}_b}{2} \sum^{k_1} t_{(3i-1)}^2$$

-continued $$\sum_{i=1}^{k_2} Z_{c(3i)} = k_2 Z_b + \dot{Z}_b \sum^{k_2} t_{(3i)} + \frac{\ddot{Z}_b}{2} \sum^{k_2} t_{(3i)}^2 \qquad \text{Group 2}$$

Note:

$k_0$ is the largest whole number $\leq \frac{n+2}{3}$

Similarly, $k_1 \leq \frac{n+1}{3}$ $k_2 \leq \frac{n}{3}$

Whenever "n" is a multiple of 3, the groups will each have the same number of data points.

These groups form three simultaneous equations in three unknowns and can be readily solved for $Z_{bn}$, $\dot{Z}_{bn}$, $\ddot{Z}_{bn}$ and radio noise effects are reduced by the averaging effect. The bias estimates derived in this manner are denoted $$\hat{Z}_{bn}, \hat{\dot{Z}}_{bn}, \hat{\ddot{Z}}_{bn}$$

The values of Z which are output thru 1019 include these estimates. The quantities which are output on 1019 are $$[Z_p] = \begin{bmatrix} Z_p \\ \dot{Z}_p \\ \ddot{Z}_p \end{bmatrix} = \begin{bmatrix} Z_c \\ \dot{Z}_c \\ \ddot{Z}_c \end{bmatrix} + [T] \begin{bmatrix} \hat{Z}_{bn} \\ \hat{\dot{Z}}_{bn} \\ \hat{\ddot{Z}}_{bn} \end{bmatrix}$$

and, $$Z_{PI} = \int_o^t (GSE) d\tau$$

where [T] was defined in the beginning of this discussion. It is noted that every time a new set of bias estimates is determined the new values of $$[T][\hat{Z}_{bn}]$$

are calculated and fade in transitions from the old to the new values are effected. $Z_{pI}$ is continuously calculated and updated.

Method 2

This method entails the classical least squares curve fitting technique. All data points are treated in a single array according to the vector equation.

$$[K_n Z_{cn}] = [K][T'_n][\hat{Z}_{bn}]$$

$$\begin{bmatrix} K_1 Z_{c1} \\ K_2 Z_{c2} \\ \vdots \\ K_n Z_{cn} \end{bmatrix} = \begin{bmatrix} R_1 & 0 & \cdots & 0 \\ 0 & K_2 & & \vdots \\ \vdots & & \ddots & 0 \\ 0 & \cdots & 0 & K_n \end{bmatrix} \begin{bmatrix} 1 & t_1 & ct_1^2 \\ 1 & t_2 & ct_2^2 \\ \vdots & \vdots & \vdots \\ 1 & t_n & ct_n^2 \end{bmatrix} \begin{bmatrix} \hat{Z}_{bn} \\ \hat{\dot{Z}}_{bn} \\ \hat{\ddot{Z}}_{bn} \end{bmatrix}$$

The quantities are as in Method 1 and the $K_1, \ldots, K_n$ are included to denote the possibility to weight the data. For example, $K_n$ could be larger than $K_1$ because the radio noise in terms of feet is getting smaller as the airfield is approached. The constant, C, is either $\frac{1}{2}$ or zero as discussed below. The above equation can be solved for $[\hat{Z}_{bn}]$ (with some effort) and, therefore, gives the desired best estimates of the $\hat{Z}_{bn}$, $\hat{\dot{Z}}_{bn}$, $\hat{\ddot{Z}}_{bn}$.

These estimates are handles as discussed in Method 1. $Z_{pI}$ is also calculated and included in signal 1019 as previously discussed.

If $C = \frac{1}{2}$ then $[T'_n] = [T_n]$

If $C = 0$ then the $\ddot{Z}_b$ is deliberately ignored (in the interest of reducing calculation effort). This could well be considered an acceptable approach but probably means that the term $Z_{pI}$ will have to be given more weight in the autopilot/flight director control laws as compared to when $C = \frac{1}{2}$.

Method 3

This method entails the classical Kalman estimating technique. Here the bias values entering the mathematical model integrations are actually changed from time to time. Consider the diagram of FIG. VIII-A.

Reference is now made to FIG. VIII-A.

Note that $Z_p$ and $\dot{Z}_p$ are generated in a manner similar to that of $\ddot{Z}_p$.

Note also that $Z_{pI}$ is still included in 1019 as above.

The scheme is to calculate $\hat{Z}_{bn}$, $\hat{\dot{Z}}_{bn}$, $\hat{\ddot{Z}}_{bn}$ on the basis of the data up to and including the latest zero crossing using estimates of the statistics associated with the system errors, i.e., expected values of variances of $Z_b$, $\dot{Z}_b$, $\ddot{Z}_b$ and radio noise.

The new bias values are inserted to make the current values of $Z_c$, $\dot{Z}_c$, $\ddot{Z}_c$ equal to the "best" estimates of what they currently should be.

As noted this entails the basic Kalman update technique which is adequately described in textbook "Applied Optimal Estimation," A. Gelb, editor, The M.I.T. Press, copyright 1974. (End of Attachment 1)

While, signal 1010 can be made available from Unit (16), normally the selected heading for landing is set on the glare shoeld panel which is part of the Avionic Flight Control System(AFCS). Modern airplanes have an integrated system which includes autopilot, autothrottle, flight director, altitude alert, etc., functions. Signal 1010 is readily available from a glareshield panel and is conventionally sent from there to the AFCS computers.

Regarding Unit 18, it accepts signals 1011 ($Y_p$, $\dot{Y}_p$, $\ddot{Y}_p$, referred to above) and processes them. The processing for autopilot use can be as simple as a simple pass through, or some processing for autopilot use can be done in Unit 18 before the signals 1012 are sent to Unit (19). The latter approach is considered herein.

Unit 18 multiplies each of the Signal 1011 quantities by an appropriate gain and sums them to make a composite command signal for driving the flight director roll axis, such circuitry being known. This same composite command signal is sent via Signal 1012 to the autopilot Unit (19) where it is treated as an outer loop command and mixed with the inner loop of the autopilot roll axis.

Unit 18 treats the Signals 1020 in a similar manner and generates a composite command signal for driving the flight director pitch axis and for transmission via Signal 1012 to Unit (19). The autopilot treats this signal as a pitch outer loop command into its pitch axis inner loop.

Ground speed, $V_G$, can be added to signals 1018, 1019 and 1020. In Unit 18, it can be combined in the autothrottle equations to provide an airspeed floor.

Essentially, Unit (22) passes the signals 1019 through to the Unit (18). It does, however, add a term to the control signals. So that signal 1020 includes not only $\ddot{Z}_p$, $\dot{Z}_p$, $Z_p$, $Z_{pI}$ referred to above, but also $\theta_{wc}$.

$\theta_{wc}$ is generated in Unit (22) as a function of airspeed (CAS). Unit (22) may be designed to be integral with Unit (18) and with Unit (19) so that all the usual flight control signals would be available.

It is intended that $\theta_{wc}$ be generated by an airspeed signal which is processed through the equivalent of a shaping network providing an anticipatory signal that the designer would optimize for the specific airplane.

Attached FIG. IV-A is a modified version of FIG. IV to re-identify a signal between Units (15) and (18). Signal 1033 as shown in FIG. IV passes data from Unit (15) to Unit (18) which is somewhat like that contained in signal 1011 of FIG. I and FIG. I-A. The processing of the data 1039 from Unit (11), to the output signal 1033, however, follows the methods described above under Attachment I. If in that discussion every "Z": is replaced by a "Y" (e.g., $Z_i \rightarrow Y_i$, and LOCE (localizer error) is substituted for GSE; the signal 1033 is then correctly defined.

It is noted that with respect to signal 1011 in FIG. I that there was no term like $Y_{pI}$ which now is included in signal 1033. It is clear that Unit (18) now must accommodate $Y_{pI}$, i.e., multiplying it by the appropriate gain and then adding it into the composite command.

With respect to vertical control, signal 1038 in FIG. IV-A is not a square wave output but otherwise it serves the same purpose as signal 1016 of FIG. I. The outgoing signal 1032 to the Flight Director is the same as signal 1019 of FIG. I. The processing of the data between 1038 and 1032 is the same., therefore, as that between 1016 and 1019 as described previously.

It is preferred that there be a gradual transition from conventional control to inertial unit control, as for example is illustrated in FIG. IX.

With respect to Unit (20) in FIG. I, the indicated adder receiving the outputs of the two glideslope antennas may be regarded as a free running multiplexer (such as that used for the localizer), and the output of Unit (21) may be a square wave. Since Unit (14) simply uses the average of the incoming signal 1016, Unite (20) may be regarded as an "averaging" unit.

I claim:

1. In apparatus useful in controlling an aircraft flight path on the final approach to landing, there being a localizer beam transmitted rearwardly toward the aircraft from the landing area, and there being an inertially responsive unit on the aircraft, the combination comprising
   (a) dual antennas carried on the aircraft and spaced apart laterally to receive said beam, and
   (b) means responsive to the beam signals received by the two antennas to coact with said inertially responsive unit to produce an output for controlling banking of the aircraft so as to minimize deviation of the aircraft inertial flight path from a vertically and rearwardly extending plane at the center of said localizer beam.

2. The combination of claim 1 wherein said means includes:
   (a) a switching and synchronizing circuit (10) connected with said antennas to separate periodically and synchronously the signals received by the two antennas,
   (b) a receiver (11) connected with said switching and synchronizing circuit to derive a resultant signal representing the difference between the two signals, and
   (c) a heading and banking angle correction circuit (12) connected with the output of said receiver for compensating said resultant signal in accordance with aircraft heading different from inbound course, and in accordance with aircraft bank angle different from level.

3. The combination of claim 2 wherein said means also includes:
   (d) a horizontal displacement resolver circuit (13) connected with the output of said correction circuit (12) to provide information representing the actual position of the aircraft relative to said vertically and rearwardly extending plane at the center of the localizer beam, said information to be used to assure a flight to intercept said plane, and also to assure that the inertial plane containing the "desired track" coincides with said radio signal derived localizer vertical plane.

4. The combination of claim 3 wherein said inertially responsive unit is connected with the output of said resolver circuit (13), and characterized in that when the aircraft first intercepts said localizer vertical plane, the enertial unit is programmed by that "present position" of the aircraft to provide a "waypoint position", and further characterized in that a "desired track" of the aircraft is thereupon programmed into the inertial unit from the relative bearing of an inbound track setting of the HSI, and the inertial unit thereupon assumes the control of the aircraft banking command function of the flight director.

5. The combination of claim 4 including a bank angle controlling flight director circuit (18) connected with the output of the inertial unit (15), and an aircraft autopilot (19) connected with the output of the flight director circuit.

6. The combination of claim 1 wherein said two antennas are located on the aircraft wings.

7. The combination of claim 6 including a localizer beam receiver means receiving said localizer beam characterized in that the signal received at one said antenna is modulated by a first characteristic frequency, and the signal received at the opposite of said antenna has a second characteristic modulated frequency.

8. The combination of claim 7 wherein the beam modulation strength at each side of said aircraft receiving system varies transversely of the beam.

9. The combination of claim 1 including two glidepath antennas which are laterally spaced apart on the aircraft, and additional means responsive to an averaged value of said signals to also coact with said inertially responsive unit to produce an output for controlling the attitude of the aircraft relative to its inertial path compared to the desired inertial path.

10. The combination of claim 9 wherein said additional means includes an antenna signal averaging circuit (20) connected to said glidepath antennas; a glidepath receiver (21) connected with said averaging circuit; and a vertical displacement resolver circuit (14) connected with the output of said receiver (21) to provide data for the alignment of a desired inertial path used to generate information representing the desired body angle attitutde of the aircraft to maintain an aircraft position to coincide with such inertial path.

11. The combination of claim 10 wherein said inertially responsive unit is connected with the output of said resolver circuit (14) to be commanded thereby, there being a flight director circuit (18) and an autopilot (19) operatively connected to said inertially responsive circuit to control the attitude of the aircraft under the command of the inertial unit.

12. In the method of controlling banking of an aircraft on its final approach to landing, there being dual antennas carried by the aircraft and spaced apart laterally to receive radio signals within a localizer beam transmitted rearwardly toward the approaching aircraft, the steps that include (a) determining the difference in beam signals received by the two antennas, and (b) utilizing said difference to command an inertially responsive device and employing said device to control the aircraft's inertial track by controlling the angle of bank to obtain an inertial track so as to coincide with the desired approach track.

13. The method of claim 12 which also includes controlling attitude of said aircraft, there being dual glidepath antennas carried by the aircraft and located close to the lowest extremity of the aircraft, said method including (c) determining an average value of beam signals received by said glidepath antennas, and (d) utilizing said average value to control an inertially responsive device and employing said device to control aircraft attitude and attitude command of the flight director.

14. The combination of claim 1 including:

(c) monitoring means for monitoring deviations of actual airspeed from desired approach airspeed, and deviations of actual groundspeed from desired approach groundspeed, and (d) other means coupled to said monitoring means for providing an indication as to which of said deviations is the lower compared to the associated desired value, from which the pilot can determine a stabilized speed condition above a safe value by adjusting power during said controlling of aircraft flight path on the final approach to landing.

15. In the production of a system of vector control of an aircraft on the final approach, the method comprising:

(a) employing a speed parameter consisting of whichever is the lesser speed; IAS compared to a target airspeed, or GS compared to the appropriate groundspeed, taking into account the appropriate TAS value of the target IAS, and applying the existing surface wind component to derive the appropriate target GS, and (b) inertially maintaining the aircraft's inertial direction of flight to coincide with a ground based electronically derived alignment system for use on the approach, and (c) inertially maintaining the aircraft's inertial height in alignment with a programmed inertial height guidance system to produce a programmed inertial height guidance command.

* * * * *